United States Patent [19]
Carr

[11] Patent Number: 5,277,038
[45] Date of Patent: Jan. 11, 1994

[54] THERMAL STORAGE SYSTEM FOR A VEHICLE

[75] Inventor: Peter Carr, Cary, N.C.

[73] Assignee: Instatherm Company, Cary, N.C.

[21] Appl. No.: 937,982

[22] Filed: Aug. 28, 1992

[51] Int. Cl.⁵ .................. F25D 17/02; F25D 11/00; B60H 1/32; B60H 3/00

[52] U.S. Cl. .................................. 62/434; 62/239; 62/244; 62/201; 62/430; 165/10; 165/41; 165/42; 165/43

[58] Field of Search .................. 62/239, 244, 201, 430, 62/434; 165/10, 41, 42, 43

[56] References Cited

U.S. PATENT DOCUMENTS

| | | | |
|---|---|---|---|
| 2,193,835 | 3/1940 | Murphy et al. | 165/18 X |
| 2,193,836 | 3/1940 | Winther | 165/18 X |
| 2,193,837 | 3/1940 | Winther | 165/18 X |
| 2,193,838 | 3/1940 | Murphy et al. | 165/18 X |
| 2,884,768 | 5/1959 | Gould | 62/225 |
| 3,128,608 | 4/1964 | Kleist | 62/430 X |
| 3,585,812 | 6/1971 | Parker | 62/430 X |
| 4,193,271 | 3/1980 | Honigsbaum | 62/180 |
| 4,556,171 | 12/1985 | Fukami et al. | 165/43 X |
| 4,761,967 | 8/1988 | Sumikawa et al. | 62/201 |
| 4,858,677 | 8/1989 | Doi et al. | 165/43 X |
| 4,899,930 | 2/1990 | Kagohata et al. | 165/43 X |
| 4,922,998 | 5/1990 | Carr | 165/10 |
| 4,972,901 | 11/1990 | Hörmansdörfer | 165/41 |
| 4,977,952 | 12/1990 | Schatz | 165/41 X |
| 5,054,540 | 10/1991 | Carr | 165/10 |
| 5,056,588 | 10/1991 | Carr | 165/10 |

FOREIGN PATENT DOCUMENTS

| | | | |
|---|---|---|---|
| 3935305 | 4/1991 | Fed. Rep. of Germany | 165/42 |
| 0194116 | 11/1982 | Japan | 165/42 |
| 0113613 | 5/1986 | Japan | 165/42 |

OTHER PUBLICATIONS

Feb., 1992 issue of *Automotive Engineering* article entitled "Latent Heat Storage", pp. 58-61.

Primary Examiner—Henry A. Bennet
Assistant Examiner—Christopher Kilner
Attorney, Agent, or Firm—Bell, Seltzer, Park & Gibson

[57] ABSTRACT

A thermal storage system for cooling and/or heating the passenger compartment of a vehicle has a heat exchanger arranged for fluid communication with a vehicle engine. The thermal storage system also has thermal energy storage means for storing thermal cooling and-/or heating and being in fluid communication with the first heat exchanger on the vehicle. The thermal storage system further has fluid control means for controlling the flow of fluid from the heat exchanger selectively between the thermal storage means and the vehicle engine.

46 Claims, 6 Drawing Sheets

THERMAL STORAGE SYSTEM FOR A VEHICLE

FIELD OF THE INVENTION

This invention relates to thermal storage systems, and more particularly to thermal storage systems for cooling and/or heating the passenger compartment or engine of a vehicle.

BACKGROUND OF THE INVENTION

Cooling and heating systems for vehicles are generally known. Most of these systems have an air conditioning system for cooling the passenger compartment of the vehicle and a separate heating system for heating the passenger compartment. The air conditioning system typically has air blown across an evaporator wherein a liquified refrigerant is expanded to a gas. The expansion of the liquified refrigerant provides cooling for the air as it blows across the evaporator. Examples of these air conditioning systems may be seen in U.S. Pat. No. 2,884,768 to Gould entitled "Automobile Refrigerating Apparatus", U.S. Pat. No. 2,193,838 to Murphy et al. entitled "Air Conditioning System For Vehicles", and U.S. Pat. No. 2,193,835 to Murphy et al. entitled "Air Conditioning System."

The heating system typically interacts with the engine coolant fluid in the radiator of the vehicle. The coolant fluid is usually heated by the operation of the vehicle engine. The heated fluid is then transported to a heat exchanger located within an air duct of the vehicle. Similar to the air conditioning system, air is blown across the heat exchanger through which the heated fluid is flowing and then into the passenger compartment during operation of the vehicle. This heated blown air provides the heat for the passenger compartment.

These heating and cooling systems also typically have an air control flap within the air duct for controlling the direction of the flow of air across these heat exchangers. A control mechanism typically allows for the manual adjustment of temperature by the vehicle passenger. More sophisticated systems were also developed for automatically adjusting the temperature of the passenger compartment to maintain the compartment at a passenger selected predetermined temperature (i.e., 72° Fahrenheit). An example of such a system may be seen in U.S. Pat. No. 4,761,967 by Sumikawa et al. entitled "Car Air Conditioner With Heat Storage Tank For Cooling Energy." These systems sense the change in temperature within the compartment and automatically control the flow of air to the compartment to adjust to the selected predetermined temperature.

Also, thermal storage systems have been developed for some air conditioning systems, such as seen in U.S. Pat. No. 4,193,271 by Honigsbaum entitled "Air Conditioning System Having Controllably Coupled Thermal Storage Capability," U.S. Pat. No. 4,922,998 by Carr entitled "Thermal Energy Storage Apparatus," and U.S. Pat. No. 5,054,540 entitled "Thermal Energy Storage Apparatus." These storage systems store cooled air for bursts of cooling needed during various periods of vehicle operation such as when climbing hills or for cooling and/or heating when the vehicle engine is not in operation.

Although numerous thermal storage systems have been proposed which are capable of improving cooling and/or heating efficiency for motor vehicles, such systems typically require substantial modification of the heating and/or cooling systems presently in use. The retrofit of such systems into existing vehicles can be difficult and/or cost prohibitive and adaptation of new vehicles to incorporate such systems can require substantial changes in the vehicle manufacturing process and/or design.

SUMMARY OF THE INVENTION

The invention provides a thermal storage system for cooling and/or heating the passenger compartment or engine of a vehicle which stores "cool" (i.e., heat is removed from a thermal storage media during charging) and/or which stores heat during operation to be released for cooling or heating at a desired time, such as prior to entering the vehicle or during vehicle start-up. The system of the invention can readily be retrofit onto existing vehicles and/or can be incorporated into new vehicles with a minimum of vehicle design and manufacturing changes. In a preferred embodiment of the invention, the existing vehicle heating coil heat exchanger is used to provide additional cooling and/or heating from a thermal storage system thereby providing for use of a thermal storage media without requiring substantial modification to heating and cooling systems of the vehicle.

The thermal storage system of the invention includes a first heat exchanger, which is typically the vehicle's heater coil, for cooling and heating air supplied to a passenger compartment of a vehicle. This first heat exchanger is arranged for fluid communication with coolant fluid circulating through the vehicle engine and with fluid circulating through a thermal storage means for cool storage and/or heat storage. A fluid control means controls the flow of fluid from the first heat exchanger selectively between the thermal storage means and the vehicle engine. Because the first heat exchanger is in fluid communication selectively with either the engine coolant fluid or with the fluid contacting the thermal storage means, the first heat exchanger can advantageously function as a heating coil for heating air supplied to the passenger compartment of the vehicle; to charge the thermal storage means; and to discharge cooling and/or heating from the thermal storage means thereby to cool or heat the passenger compartment of the vehicle.

To charge the thermal storage means for cool storage, the fluid control means is used to establish fluid circulation between the heat exchanger and the thermal storage means, and cool air is directed across the first heat exchanger. The fluid circulating through the first heat exchanger is cooled because of the cool air contacting the heat exchanger. The cooled fluid is passed from the first heat exchanger through the thermal storage means for cooling thereof (i.e., heat is removed from the thermal storage media), and then the fluid is circulated back to the first heat exchanger for further cooling. When the thermal storage means has been fully charged, the same fluid circulation path is used to circulate cooled fluid through the first heat exchanger for cooling air passed across the first heat exchanger which can then be used to cool the vehicle's passenger compartment. To charge the thermal storage means for heat storage, the fluid control means is used to establish fluid circulation between the thermal storage means and the vehicle engine. Heated fluid circulating from the engine then charges the thermal storage means.

The system of the invention can advantageously employ the air conditioning coil upstream from the heating coil in a conventional vehicle in order to provide cooling for the first heat exchanger when the system is being charged for cool storage. Preferably the first heat exchanger is the heating coil already present in the vehicle. Thus, the system of the present invention can be retrofit on existing vehicles with minimal modifications to the existing heating and air conditioning systems and/or adapted for use in newer vehicles with minimal modifications thereto.

BRIEF DESCRIPTION OF THE DRAWINGS

Some of the objects and advantages of the present invention having been stated, others will become apparent as the description proceeds when taken in conjunction with the accompanying drawings, in which.

DESCRIPTION OF A PREFERRED EMBODIMENT

Figure 1:
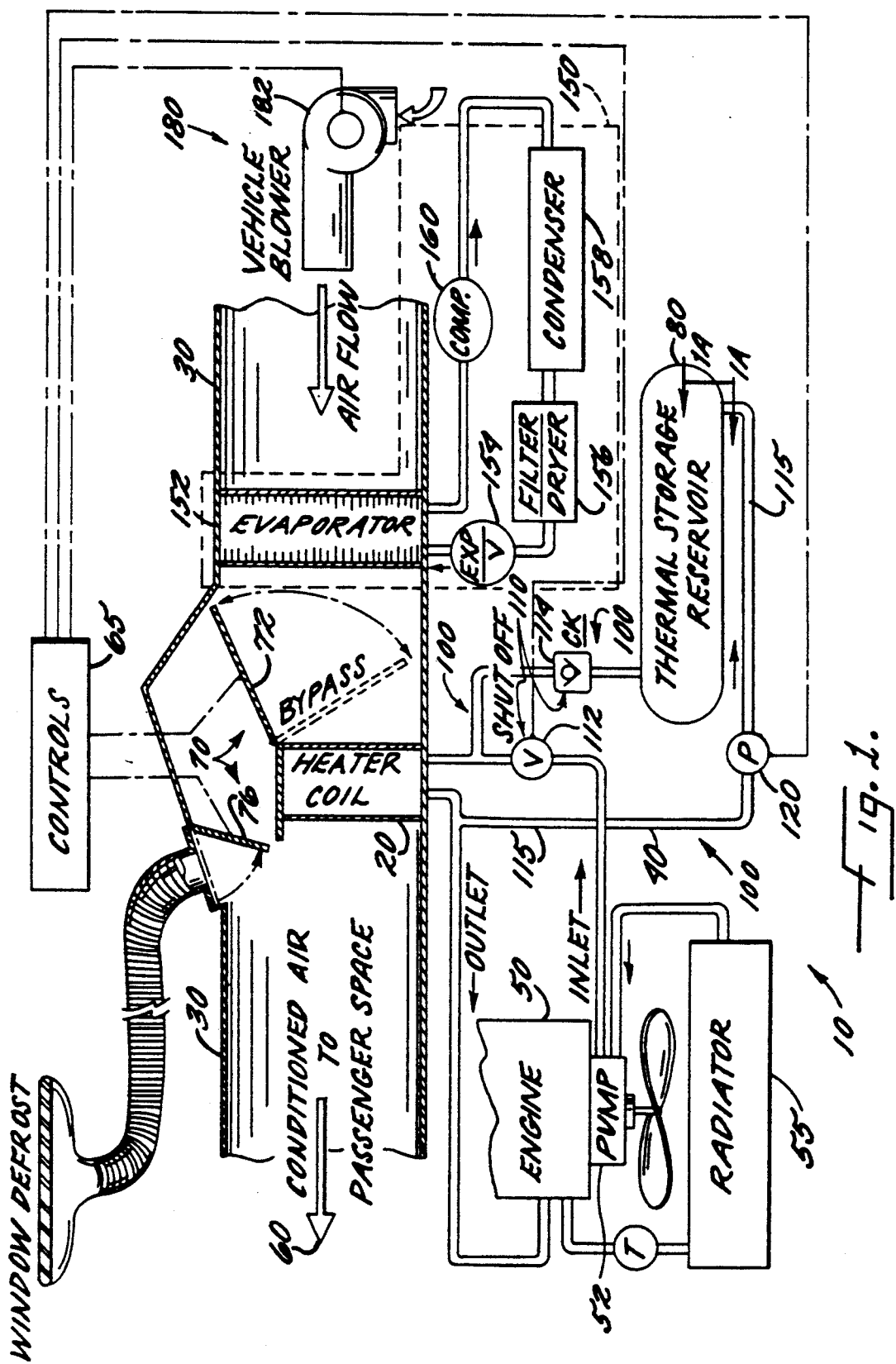
FIG. 1 schematically illustrates the thermal storage system according to the present invention.

Referring more particularly to the drawings, FIG. 1 schematically illustrates the thermal storage system 10 according to the present invention and will now be discussed to illustrate the various elements therein. A first heat exchanger 20 is disposed within an air duct 30 of a vehicle. The first heat exchanger 20 is arranged in fluid communication with coolant fluid 40 circulating through the vehicle engine 50 and through the vehicle radiator 55. The pump 52 enables the coolant fluid 40 to circulate through the radiator 55 to keep the engine 50 cool during operation.

FIG. 1 also illustrates the thermal storage means 80 for storing thermal energy (i.e., heating and/or cooling). The thermal storage means 80 is in fluid communication with the first heat exchanger 20. Fluid control means 100 controls the flow of fluid from the first heat exchanger 20 selectively between the thermal storage means 80 and the vehicle engine 50. Fluid control means 100 has a valve control means 110 fluidly connected between the first heat exchanger 20 and the thermal storage means 80 for controlling the direction of fluid 40 flow through the thermal storage 80 and the first heat exchanger 20. The fluid control means 100 also has pump means 120, such as a pump, fluidly connected to the thermal storage means 80 and the first heat exchanger 20 by piping 115. The pumping means 120, pumps or circulates fluid 40 through the thermal storage means 80 and the first heat exchanger 20. The pump means 120 may be controlled by the control means 65 to turn on or off the pump means 120. The control means may be formed of electrical, mechanical, electromechanical, or other types of controls and may be remotely located with respect to the pump means 120, valve means 110, and/or air flow control means 70. The valve means 110 has a shut-off valve 112 which may also be controlled by control means 65 for selectively closing the directional flow of the fluid 40 to the first heat exchanger 20 from the engine 50 and thereby directing the flow of fluid 40 to the thermal storage means 80. The valve means 110 also has a check valve 114 to prevent fluid 40 from flowing into the thermal storage means 80 in one direction and to allow fluid 40 to flow from the thermal storage means 80 in the other direction.

FIG. 1 further illustrates a second heat exchanger 150 in the form of an air conditioning system having an evaporator 152, an expansion valve 154, a filter/dryer 156, and a condenser 158 in communication with the compressor 160 as typically used in conventional vehicles. A blower means 180 in the form of a fan 182 blows air across the first 20 and second 150 heat exchangers. The blower means 180 may also be controlled by the control means 65. An air flow control means 70 controls the flow of air to the first heat exchanger 20. The air flow control means 70 has an air control flap 72 located within the air duct 74. A defrost control flap 76 may also be provided to control the flow of air to the windows of the vehicle. The air control means may be controlled by the control means 65.

The system of the invention can readily be retrofit onto existing vehicles and/or can be incorporated into new vehicles with a minimum of vehicle design and manufacturing changes. The engine, radiator, heating coil or first heat exchanger 20, air conditioning system or second heat exchanger 150, and the air control flap 72 in the air duct 74, are all common to many existing vehicles. The system of the present invention uses piping 115, the valve means 110, the pump means 120, control means 65, and the thermal storage means 80 typically arranged as shown in FIG. 1 to provide the thermal storage system.

For retrofit purposes, the piping 115 is connected to the outlet piping from the heating coil going to the engine. The piping 115 is also connected to the inlet piping. The shut-off valve 112 is used to prevent fluid from circulating to the first heat exchanger 20 for charging the thermal storage system. The shut-off valve 112 may be opened for prewarming or precooling the engine 50 as discussed further in FIG. 5. A check valve 114 may be used in the system on one end of the piping 115 coming from the thermal storage means 80 to prevent fluid from circulating from the inlet to the first heat exchanger 20 when the thermal storage means 80 is not being charged or used. The pump means 120 may be used to pump fluid 40 through the thermal storage means 80 and the first heat exchanger 20 as described above. The piping 115, the valve means 110, the pump means 120, and the thermal storage means 80 are all typically well insulated with an insulating material 89 as shown in FIG. 1A.

Figure 1A:
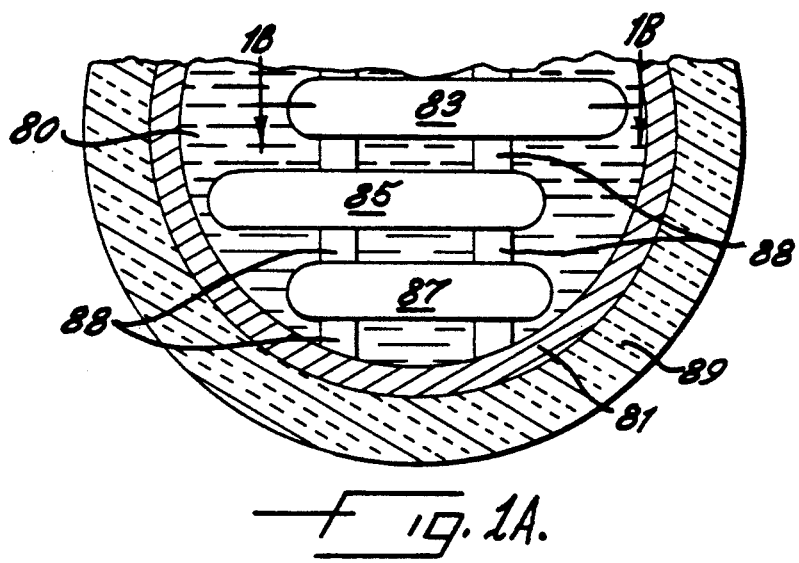
FIG. 1A schematically illustrates an enlarged fragmentary view of the thermal storage means according to the present invention taken along line 1A—1A of FIG. 1.
Figure 1B:
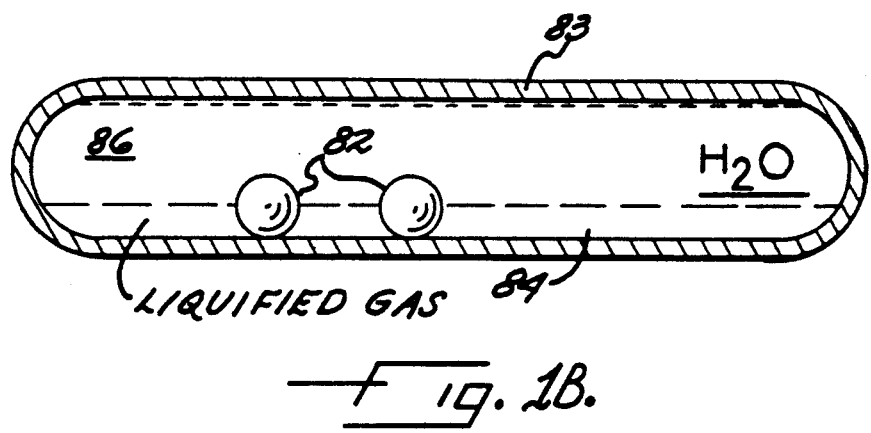
FIG. 1B schematically illustrates an enlarged fragmentary view of the container within the thermal storage means according to the present invention taken along line 1B—1B of FIG. 1A.

FIGS. 1A and 1B further illustrate one preferred embodiment of the thermal storage means according to the present invention. FIG. 1A schematically illustrates an enlarged fragmentary view of the thermal storage means so as shown in FIG. 1. The thermal storage means 80 has a reservoir 81 with a plurality of separate elongated and sealed thermal storage containers 83, 85, 87 disposed therein for storing cooling and/or heating. The containers 83, 85, 87 are arranged in indirect heat exchange relation with the fluid 40 circulating through the thermal storage reservoir 81 to and from the first heat exchanger 20. The thermal storage reservoir 81, as well as the piping 115, the pump means 120, and the valve means 110, are wrapped, encased, or the like with an insulating material 89 typically having a fibrous composition.

FIG. 1B schematically illustrates an enlarged view of a container 83 taken along line 1B—1B of FIG. 1A. A storage medium 82 is disposed within the elongated sealed thermal storage containers 83, 85, 87. The medium 82 in the container 83 includes a material such as water 84 and a liquified gas 86 capable of forming a gas hydrate with the water 84 at a predetermined transition temperature. The thermal storage container 83 also has movable means 84 in the form of two freely movable balls positioned within the container 83 for providing mechanical movement within the medium 82 to thereby facilitate the formation of the gas hydrate 86 at or below a predetermined transition temperature. This transition temperature is typically substantially above 32 degrees Fahrenheit. The sealed containers 83, 85, 87 can also include an emulsifying agent to maximize dispersion of the liquified gas and the water phases.

A listing of upper transition temperatures for a number of gas hydrates is shown in the table below. These examples illustrate the wide variety of gases for which hydrates are known, and provides a partial listing of the invariant points obtainable.

TABLE I

| | Upper Invariant Point | |
|---|---|---|
| Temperature (°F.) | Pressure (psia) | Gas |
| 49.8 | 653 | $CO_2$ |
| 49.8 | 40 | $CHBrF_2$ |
| 50 | 24.5 | $CBrClF_2$ |
| 53.6 | 603 | $N_2O$ |
| 53.6 | 18 | $CH_3SH$ |
| 53.8 | 34 | $SO_2$ |
| 53.8 | 63 | $CCl_2F_2$ |
| 55.6 | 33.5 | $CH_3CClF_2$ |
| 57.2 | 293 | $SF_6$ |
| 58.5 | 492 | $C_2H_6$ |
| 58.5 | 22 | $CH_3Br$ |
| 58.8 | 63 | $CH_3CHF_2$ |
| 59.0 | 485 | $C_2H_2$ |
| 61.2 | 82 | Cyclopropane |
| 61.3 | 112 | $CHClF_2$ |
| 64.2 | 42 | $CH_2ClF$ |
| 65.8 | 470 | $CH_3F$ |
| 68.9 | 72 | $CH_3Cl$ |
| 73.0 | 118 | $C_2H_5F$ |
| 77.0 | 38 | BrCl |
| 82.9 | 123 | $Cl_2$ |
| 82.9 | 257 | $AsH_3$ |
| 85.1 | 325 | $H_2S$ |
| 86.0 | 162 | $H_2Se$ |

Any of various emulsifying, surfacants or wetting agents can, also, be included to promote mixing of the gas or gas hydrate and water. These can include polyglycerol oleate materials such as decaglycerol tetraoleate (available as CAPROL 106-40 from Capital City Products) and perfluaroalkyl ethoxylate (ZONYL, Dupont), both of which have shown improved mixing and hydrate formation; sorbitan monoisostearate (available as CRILL 6 from Croda, Inc.) which appeared to have a more limited effect, and the like. Other surfacants to promote hydrate formation are set forth in U.S. Pat. No. 4,821,794 to Tsai et al. which is incorporated herein by reference.

The flow of fluid 40 continues to flow through the thermal storage means so as described above to thereby store the cooled air created by the phase change of the material within the containers 83. Thermal storage media other than gas hydrates can also be used in one or more of the containers 83, 85, 87 to affect indirect heat exchange in the present invention in combination with or in lieu of the preferred gas hydrate storage media. Such storage media can include liquids having a high heat capacity, such as water, brine ethylene glycol, and the like; relatively pure phase transition storage materials, such as formic acid, 1, 2-dibromoethane, n-hexadecane, n-tetradecane, benzene, cyclohexane, and the like; inorganic salt hydrate materials, such as sodium chloride-sodium sulfate decahydrate, sodium manganate decahydrate; sodium chromate decahydrate, and the like. Various mixtures of these various materials or media may also be used to form the thermal storage medium in accordance with the present invention.

Figure 2:
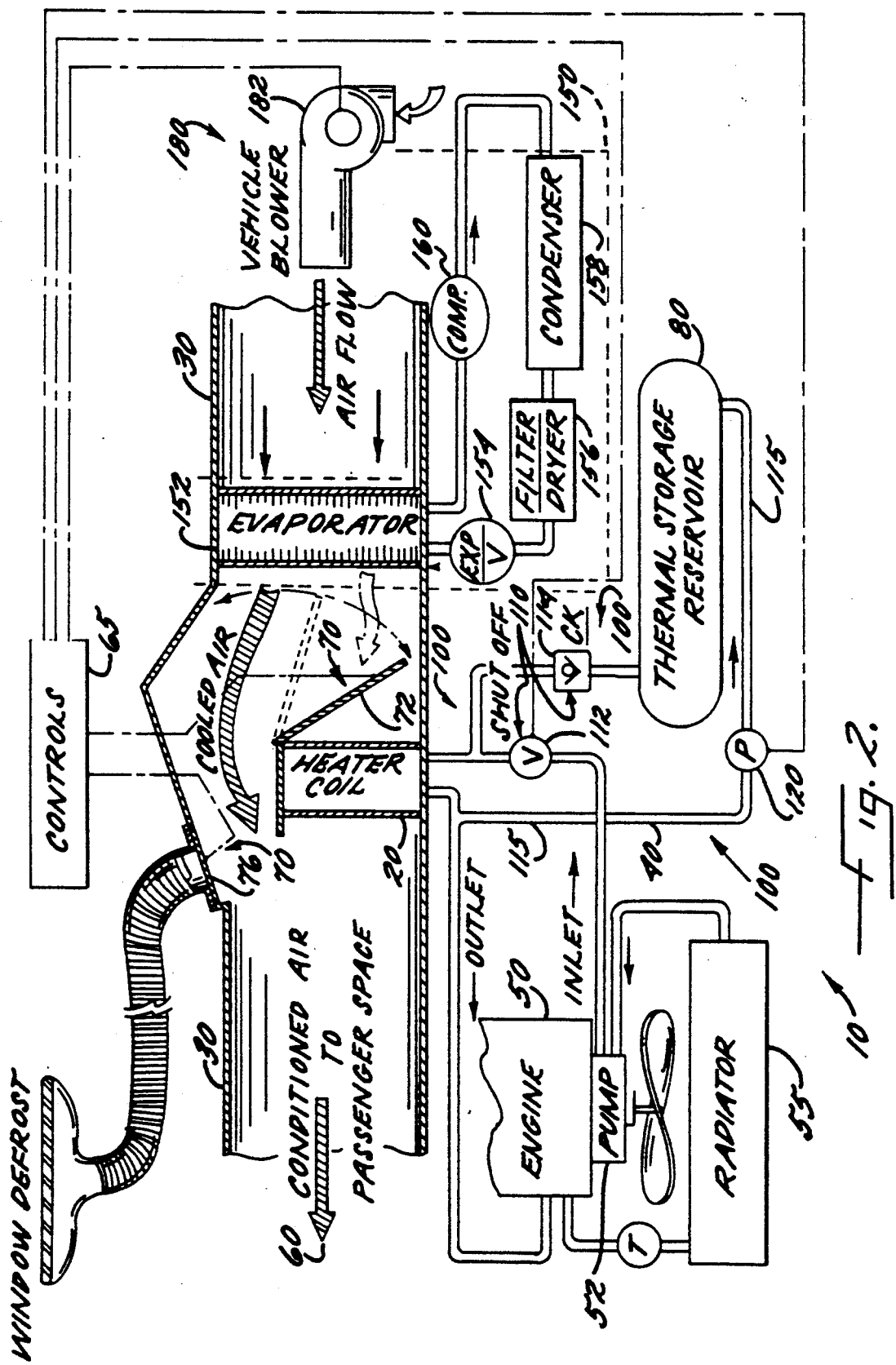
FIG. 2 schematically illustrates the position of the air flow control means of the thermal storage system for cooling the passenger compartment according to the present invention.

FIGS. 2-5 further illustrate the operation of the thermal storage system according to the present invention. FIG. 2 schematically illustrates the movement of the air control flap 72 within the air duct 74 as air is blown from the fan 182 across the second heat exchanger 150 to cool the air. The air control flap 72 is positioned so as to limit the flow of air across the first heat exchanger 20. This allows the passenger compartment 60 to receive relatively cool air. If the temperature of the compartment is too cool or needs to be somewhat warmer, the air control flap 72 is slightly raised to allow a small amount of air to blow across the first heat exchanger 20. This process thereby allows warmer air to pass into the passenger compartment 60 and raise the temperature therein.

Figure 3:
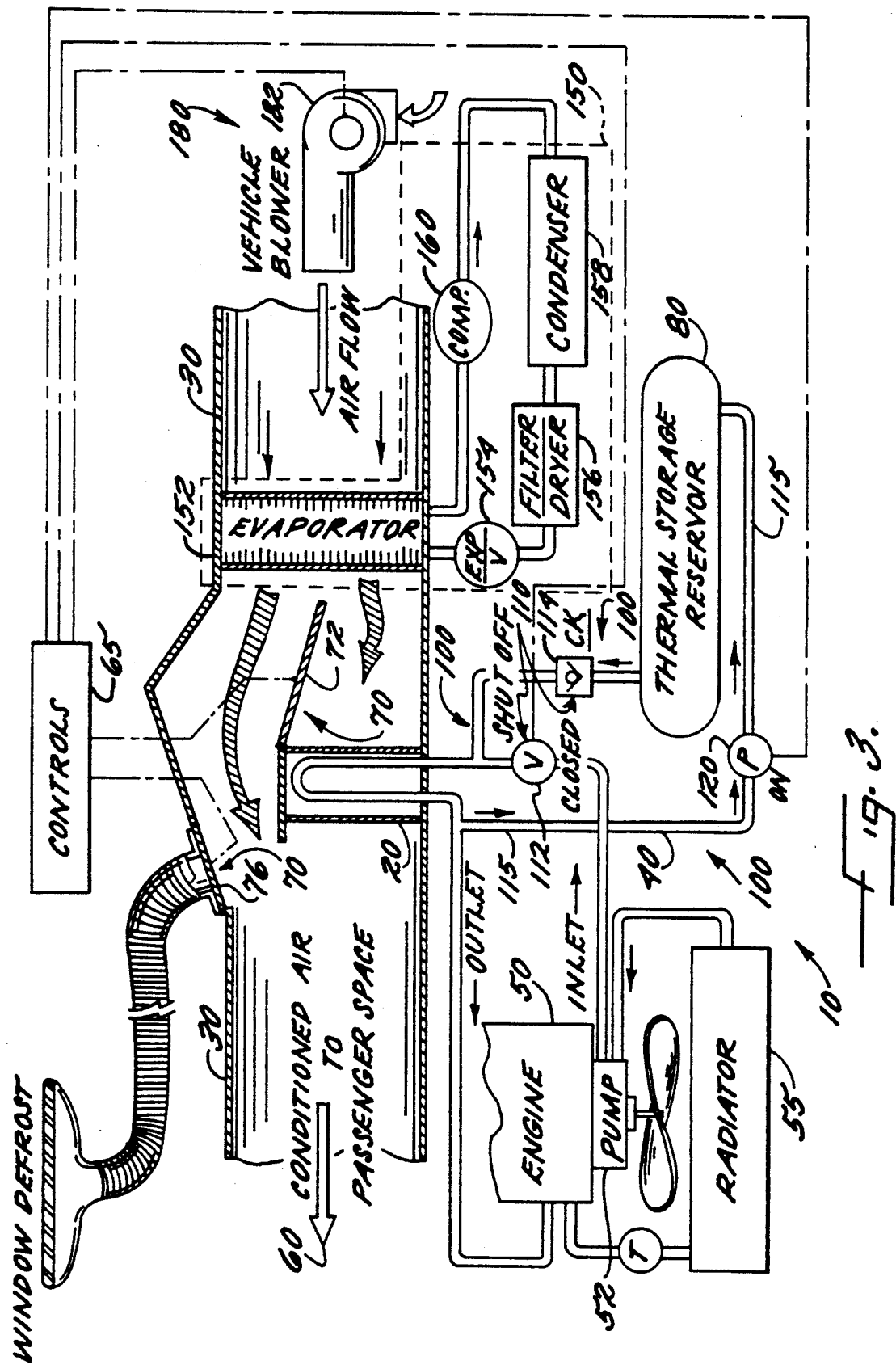
FIG. 3 schematically illustrates the charging of the thermal storage means for cool storage during the cooling of the passenger compartment according to the present invention.

FIG. 3 illustrates the storing of cool in the thermal storage means 80 during the norma) cooling of the passenger compartment 60. To charge the thermal storage means so, the control means 65 is used to close the shut-off valve 112, raise the air control flap 72, and turn on the pump means 120. Fluid 40 then circulates from the thermal storage means so through check valve 114, and up to the first heat exchanger 20. The pump means 120, in turn, pulls the fluid from the first heat exchanger 20 through the thermal storage means 80 to circulate the fluid.

Figure 4:
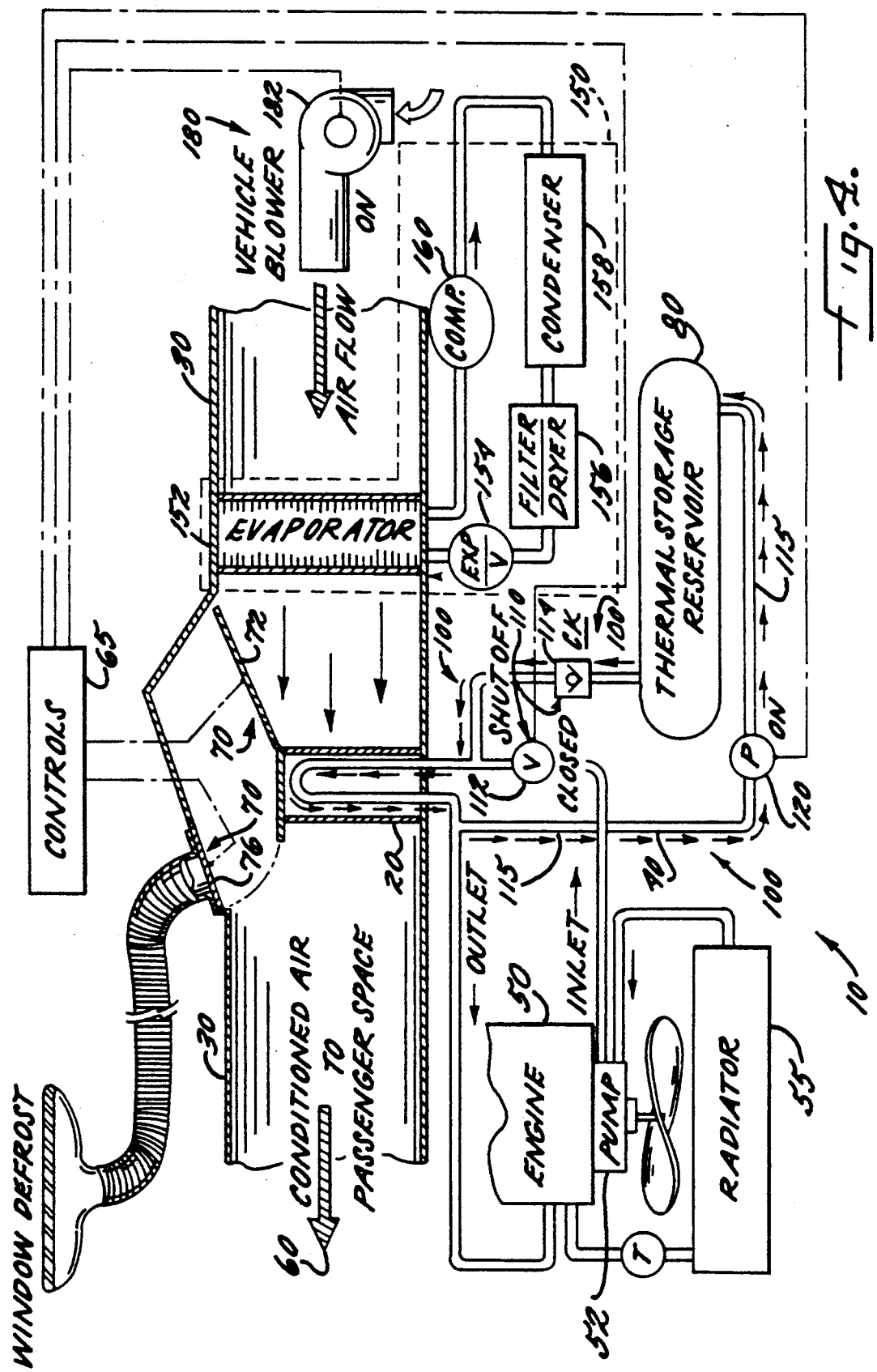
FIG. 4 schematically illustrates the pre-cooling of the passenger compartment by use of pre-cooled air or colder temperatures transferred to the air from the thermal storage means according to the present invention.

, After a vehicle has been sitting in the hot sun for a time, FIG. 4 illustrates how the stored cool energy may be released from the thermal storage means 80 to thereby cool the hot passenger compartment 60. The air control flap 72 is raised to limit the flow of air around the first heat exchanger 20 and to thereby force the air across the first heat exchanger 20. The arrows indicate the typical fluid circulation path for the discharge or cooling operation. Because of the phase change transition in the thermal storage means 80 (as discussed with reference to FIGS. 1A and 1B), cool energy is provided to the fluid 40 so that the air blown from the blower means 180 cools the passenger compartment.

Figure 5:
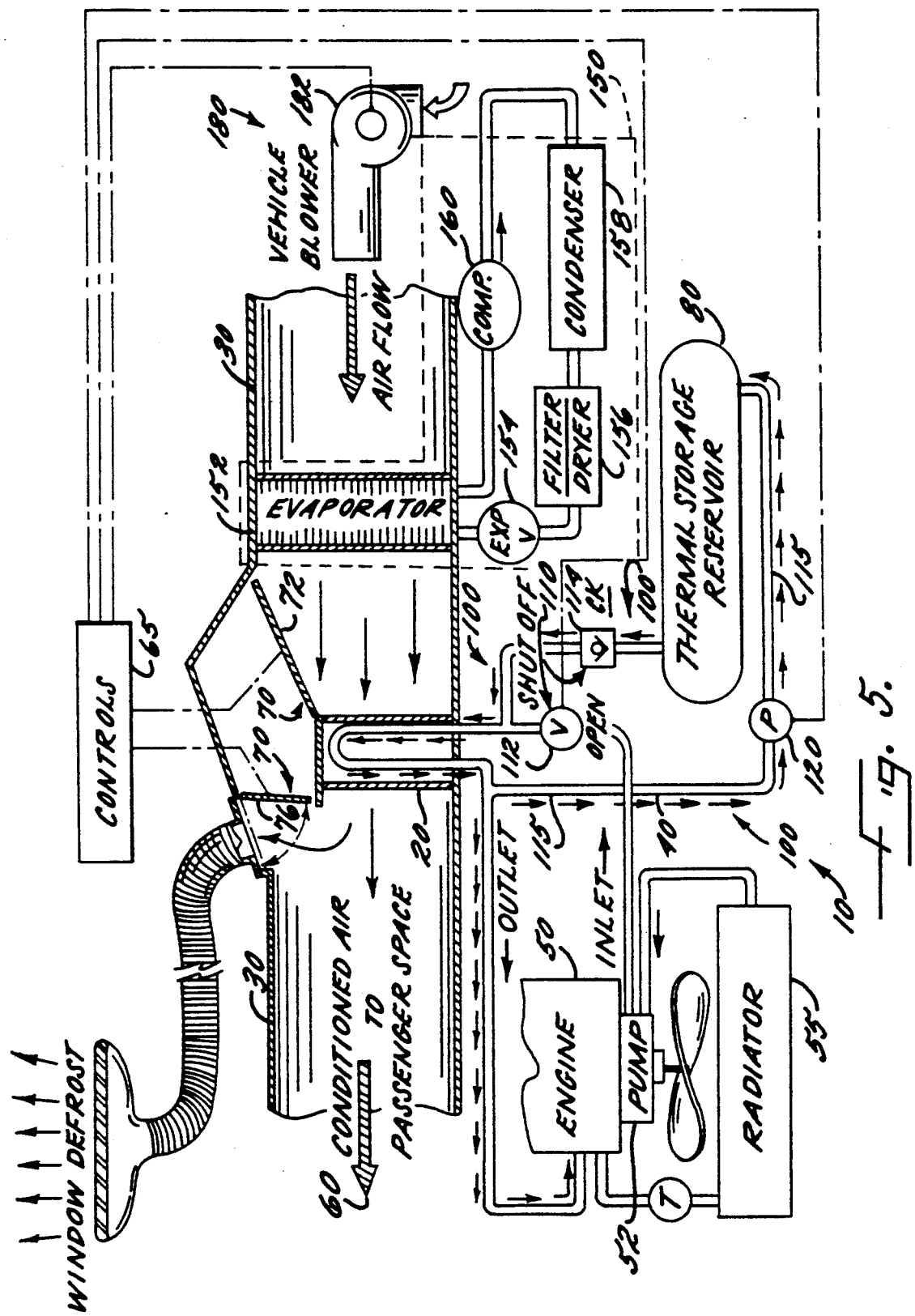
FIG. 5 schematically illustrates the preheating of the passenger compartment and/or engine from the heat stored in the thermal storage means according to the present invention.

FIG. 5 illustrates a similar effect for heating the passenger compartment 60 and the engine 50 of the vehicle when the thermal storage means has been charged with heat (i.e., used for heat storage). In this embodiment, the defrost control flap 76, which has otherwise been closed, may also be opened via control means 65 to allow heated air to pass to the windows of the vehicle for defrost purposes. The shut-off valve 112 is opened to allow the heated fluid 40 to also circulate to the engine during this operation thereby providing the prewarming as needed. The warm energy provided by the thermal storage means 80 may thus be used to heat the engine as needed.

The fluid flow path as illustrated in FIG. 5 may also be used to charge the thermal storage means 80 with heat typically during operation of the engine. In this embodiment, the heat generated from the operation of the engine 50 is used to transfer heat to the thermal storage means 80 via the fluid flow or circulation path indicated by the arrows. The shut-off valve 112 is also open for this embodiment.

It will be apparent to those skilled in the art that various changes and modifications can be substituted for those parts of the system described herein. For example, thermal storage media other than those specifically described herein can be advantageously used. Similarly, the air control flap for controlling the flow of air to the first heat exchanger can be eliminated where desirable. Further, various substitutes for the valves and pumps, and/or additional valves and pumps, illustrated in the drawings can be employed in accordance with the invention. Moreover, a plurality of thermal storage reservoirs and/or thermal storage systems may be added to the vehicle in accordance with the invention.

In the drawings and specification, there have been disclosed typical preferred embodiments of the invention and, although specific terms are employed, they are used in a descriptive sense only and not for the purposes of limitation. The invention has been described in considerable detail with specific reference to various preferred embodiments. It will be apparent, however, that various modifications and changes can be made within the spirit and scope of the invention as described in the foregoing specification and defined in the appended claims.

I claim:

1. A thermal storage system for cooling and/or heating a passenger compartment or engine of a vehicle, comprising:
    first heat exchange means for heat exchange with air supplied to the passenger compartment of the vehicle and being arranged for fluid communication with the vehicle engine;
    thermal storage means for storing thermal energy, said thermal storage means being arranged for fluid communication with said first heat exchange means for storing of thermal energy therefrom;
    second heat exchange means for supplying cooled air to said passenger compartment of the vehicle and being positioned upstream of said first heat exchange means; and
    fluid control means for selectively establishing fluid circulation between said first heat exchange means and a selected one of said thermal storage means and the vehicle engine;
    whereby said first heat exchange means is capable of selective heating or cooling of said air supplied to the passenger compartment by exchange of heat or cool energy from fluid circulating from said engine or said thermal storage means respectively, and can additionally charge said thermal storage means with cool energy by heat exchange with cooled air from said second heat exchange means.

2. The thermal storage system of claim 1, further comprising air flow control means for controlling flow of air to said first heat exchange means from said second heat exchange means.

3. The thermal storage system of claim 2, wherein said first heat exchange means and said air flow control means are disposed within air duct of the vehicle.

4. The thermal storage system of claim 2, further comprising control means for controlling the air flow control means and/or the fluid control means.

5. The thermal storage system of claim 1, wherein said fluid control means comprises:
    valve means fluidly connected between said first heat exchange means and said thermal storage means for controlling the direction of fluid flow between said thermal storage means and said first heat exchange means; and
    pump means fluidly connected to said thermal storage means and to said first heat exchange means for circulating fluid between said thermal storage means and said first heat exchange means.

6. The thermal storage system of claim 5, wherein said valve means comprises:
    a shut-off valve for closing the flow of fluid from the engine to said first heat exchange means; and
    a check valve to prevent fluid from flowing into said thermal storage means in one direction and to allow fluid to flow from said thermal storage means in the other direction.

7. The thermal storage system of claim 1, wherein said thermal storage means comprises:
    a container for storing thermal energy; and
    a storage medium disposed in said container, said medium being capable of storing thermal energy, said medium being arranged for indirect heat exchange relation with the fluid circulating through said thermal storage means.

8. The thermal storage system of claim 7, wherein said thermal storage means comprises a plurality of said containers for storing thermal energy.

9. The thermal storage system of claim 7, wherein said medium comprises water and a gas capable of forming a gas hydrate with the water at a predetermined transition temperature.

10. The thermal storage system of claim 9, wherein the predetermined transition temperature is above 32 degrees Fahrenheit.

11. The thermal storage system of claim 9, further comprising movable means positioned within said container for providing mechanical movement within said medium to thereby facilitate the formation of the gas hydrate at or below the predetermined transition temperature.

12. The thermal storage system of claim 11, wherein the predetermined transition temperature is above 32 degrees Fahrenheit.

13. The thermal storage system of claim 1, wherein said first heat exchange means comprises a heater coil of the vehicle.

14. The thermal storage system of claim 1, wherein said second heat exchange means comprises an evaporator disposed within an air duct of the vehicle.

15. The thermal storage system of claim 14, wherein said second heat exchange means further comprises an expansion valve, a condenser, and a compressor.

16. The thermal storage system of claim 2, wherein said air flow control means is located within an air duct of the vehicle and comprises an air control flap disposed within the air duct.

17. The thermal storage system of claim 1, further comprising blower means blowing air across the first heat exchange means.

18. The thermal storage system of claim 17 wherein said blower means further blows air across said second heat exchange means.

19. The thermal storage system of claim 17, wherein said blower means comprises a fan.

20. A thermal storage system for cooling and/or heating the passenger compartment or engine of a vehicle, comprising:
    a heater coil being arranged for heat exchange with air supplied to the passenger compartment of the vehicle and being arranged for selective fluid communication with coolant fluid circulating through the vehicle engine;
    thermal storage means for storing thermal energy, said thermal storage means being arranged for selective fluid communication with said heater coil for storing of thermal energy therefrom and discharge of thermal energy thereto; and
    a heat exchanger upstream from said heater coil for supplying cooled air to said heater coil so that cool thermal energy is stored in said thermal storage means.

21. The thermal storage system of claim 20, wherein said thermal storage means comprises a container and a storage medium disposed within said container, said medium comprises water and a gas capable of forming a gas hydrate with the water at a predetermined transition temperature.

22. The thermal storage system of claim 21, wherein the predetermined transition temperature is above 32 degrees Fahrenheit.

23. The thermal storage system of claim 21, wherein said thermal storage means further comprises movable means positioned within said container for providing mechanical movement within said medium to thereby facilitate the formulation of a gas hydrate at or below a predetermined transition temperature.

24. The thermal storage system of claim 23, wherein the predetermined transition temperature is above 32 degrees Fahrenheit.

25. The thermal storage system of claim 21, wherein said material of said storage medium comprises a phase change material.

26. The thermal storage system of claim 25, wherein said phase change material comprises a liquid/gaseous phase change material.

27. The thermal storage system of claim 25, wherein said phase change material comprises a solid/liquid phase change material.

28. The thermal storage system of claim 25, wherein said phase change material comprises a solid/gaseous phase change material.

29. The thermal storage system of claim 20, further comprising fluid control means for controlling the flow of fluid from said heat exchanger selectively between said thermal storage means and the vehicle engine.

30. The thermal storage system of claim 29, wherein said fluid control means comprises pump means fluidly connected to said heat exchanger and said thermal storage means for pumping fluid from said heat exchange to said thermal storage means.

31. The thermal storage system of claim 30, wherein said fluid control means further comprises valve means for controlling the direction of fluid flow through said thermal storage means and said heat exchanger.

32. A thermal storage system adapted to be connected to a vehicle for cooling and heating a passenger compartment thereof, comprising:
    thermal storage means for storing cooling and/or heating, said thermal storage means adapted to be fluidly connected to and provide fluid communication with an existing heater coil disposed within an air duct of the vehicle downstream from an existing heat exchanger disposed within said air duct and arranged for cooling air within said duct so that cool thermal energy can be received by said heating coil for storage in said thermal storage means; and
    fluid control means adapted for selectively establishing fluid circulation between the heat exchanger and said thermal storage means or the vehicle engine.

33. The thermal storage system of claim 32, wherein said thermal storage means comprises:
    a container for storing thermal energy; and
    a storage medium disposed in said container, said medium including material capable of storing cooling and/or heating said material in said medium being arranged for indirect heat exchange relation with the fluid circulating through said medium to and from said heater coil.

34. The thermal storage system of claim 33, wherein said material comprises water and a gas capable of forming a gas hydrate with the water at a predetermined transition temperature.

35. The thermal storage system of claim 34, wherein the predetermined transition temperature is above 32 degrees Fahrenheit.

36. The thermal storage system of claim 33, further comprising movable means positioned within said container for providing mechanical movement within said medium to thereby facilitate formation of a gas hydrate at or below a predetermined transition temperature.

37. The thermal storage system of claim 34, wherein the predetermined transition temperature is above 32 degrees Fahrenheit.

38. The thermal storage system of claim 32, further comprising air flow control means for controlling the flow of air to said heater coil.

39. The thermal storage system of claim 38, wherein said air flow control means comprises an air control flap disposed in the air duct of a vehicle.

40. The thermal storage system of claim 32, further comprising control means for responsively controlling said fluid control means.

41. A method of cooling and heating a passenger compartment or engine of a vehicle, comprising the steps of:
    transporting air across a first heat exchanger from a second heat exchanger upstream of the first heat exchanger for supply to the passenger compartment of the vehicle, the first heat exchanger being arranged for fluid communication with fluid circulating through the engine of the vehicle and the second heat exchanger being arranged to receive fluid from an air conditioning system of the vehicle;

circulating fluid between the first heat exchanger and a thermal storage reservoir in fluid communication with the first heat exchanger for storing thermal energy from the fluid in the reservoir when said air conditioning system provides cooled fluid to the second heat exchanger;

circulating fluid between said first heat exchanger and the engine for heating of the air transported to the passenger compartment; and selectively releasing the stored energy to the fluid so as to provide cool thermal energy to the passenger compartment or engine of the vehicle.

42. The method of claim 41, further comprising the step of:

controlling the fluid flow from the first heat exchanger selectively between the thermal storage container and the vehicle engine.

43. The method of claim 41, further comprising the step of:

providing an air flow control flap for directing the flow of air across the first heat exchanger from the second heat exchanger.

44. The method of claim 43, further comprising the step of:

controlling the air flow control flap so as to direct the flow of air across the first heat exchanger.

45. The method of claim 41, further comprising the step of:

transporting air across the second heat exchanger upstream of the first heat exchanger and thereafter passing air to the first heat exchanger.

46. The method of claim 45, wherein the second heat exchanger comprises an evaporator of an air conditioning system on a vehicle.

* * * * *

UNITED STATES PATENT AND TRADEMARK OFFICE
CERTIFICATE OF CORRECTION

PATENT NO. : 5,277,038

DATED : January 11, 1994

INVENTOR(S) : Peter Carr

It is certified that error appears in the above-identified patent and that said Letters Patent is hereby corrected as shown below:

On the title page: Item [56]

FOREIGN PATENT DOCUMENTS:

In the third cited patent, "0113613" should be -- 0113513 -- .

Column 4, line 7, "so" should be -- 80 --.

Column 4, line 19, "so" should be -- 80 --.

Column 4, line 21, "so" should be -- 80 --.

Column 4, line 31, "a)so" should be -- also --.

Column 4, line 66, "so" should be -- 80 --.

Column 5, line 7, "so" should be -- 80 --.

UNITED STATES PATENT AND TRADEMARK OFFICE
CERTIFICATE OF CORRECTION

PATENT NO. : 5,277,038
DATED : January 11, 1994
INVENTOR(S) : Peter Carr

It is certified that error appears in the above-identified patent and that said Letters Patent is hereby corrected as shown below:

Column 6, line 11, "so" should be -- 80 --.
Column 6, line 46, "norma)" should be -- normal --.
Column 6, line 51, "so" should be -- 80 --.

Signed and Sealed this

Sixteenth Day of August, 1994

*Attest:*

BRUCE LEHMAN

*Attesting Officer*   *Commissioner of Patents and Trademarks*